United States Patent
Popjoy

(10) Patent No.: US 6,206,153 B1
(45) Date of Patent: Mar. 27, 2001

(54) ADJUSTABLE INSTALLATION WITH A CONTROLLED LOCKING GAS SPRING AND AN EMERGENCY LOCKING GAS SPRING

(75) Inventor: Mark A. Popjoy, Lansdale, PA (US)

(73) Assignee: Fichtel & Sachs Industries, Inc., Gastonia, NC (US)

( * ) Notice: Subject to any disclaimer, the term of this patent is extended or adjusted under 35 U.S.C. 154(b) by 0 days.

(21) Appl. No.: 09/474,232

(22) Filed: Dec. 29, 1999

Related U.S. Application Data

(62) Division of application No. 08/815,423, filed on Mar. 11, 1997.

(51) Int. Cl.[7] .............................................. F16F 9/32
(52) U.S. Cl. ............... 188/300; 188/382.1; 188/322.15; 297/362.12
(58) Field of Search ................... 188/269, 300, 188/282.1, 280, 322.15, 322.18, 322.22; 267/64.12; 297/354.1, 362.13

(56) References Cited

U.S. PATENT DOCUMENTS

| | | | |
|---|---|---|---|
| 3,580,635 | 5/1971 | Posh | 297/362.13 |
| 3,662,649 | 5/1972 | Williams | 89/40.11 |
| 3,765,720 | * 10/1973 | Sakai | 297/330 |
| 4,230,309 | * 10/1980 | Schnitzius | 188/300 |
| 4,709,790 | * 12/1987 | Freitag et al. | 188/300 |
| 5,037,132 | 8/1991 | Borlinghaus et al. | 297/470 |
| 5,246,271 | 9/1993 | Boisset | 297/362.13 |
| 5,263,767 | 11/1993 | Asbjornsen et al. | 297/320 |
| 5,273,240 | 12/1993 | Sharon | 244/122 R |
| 5,277,281 | 1/1994 | Carlson et al. | 188/267 |
| 5,435,625 | 7/1995 | Weber | 297/362.13 |
| 5,568,961 | * 10/1996 | Colasanti | 297/362.12 |
| 5,620,066 | * 4/1997 | Schutter | 188/300 |

OTHER PUBLICATIONS

Stabilus product literature on Bloc–O–Lift.
Stabilus Engineering Drawing No. 1056.

* cited by examiner

Primary Examiner—Matthew C. Graham
Assistant Examiner—Mariano Sy
(74) Attorney, Agent, or Firm—Baker Botts L.L.P.

(57) ABSTRACT

An adjustable installation includes a body and a member carried by the body for adjustment among a plurality of positions by movements substantially in tandem of two spaced-apart locations on the member. A controllable locking gas spring is coupled between the body and the member at one of the locations, and an emergency locking gas spring is coupled between the body and the member at the other of the locations. The emergency locking gas spring normally acts like a non-locking gas spring and is thus in a follower relationship to the controllable locking gas spring but is locked automatically in either of two ways, depending on its design. In some designs, the emergency locking gas spring locks when a force greater than a predetermined force is imposed on it. In other designs, the emergency locking gas spring is locked in response to a signal generated by an acceleration detector upon detection of an acceleration of the installation greater than a predetermined acceleration.

18 Claims, 4 Drawing Sheets

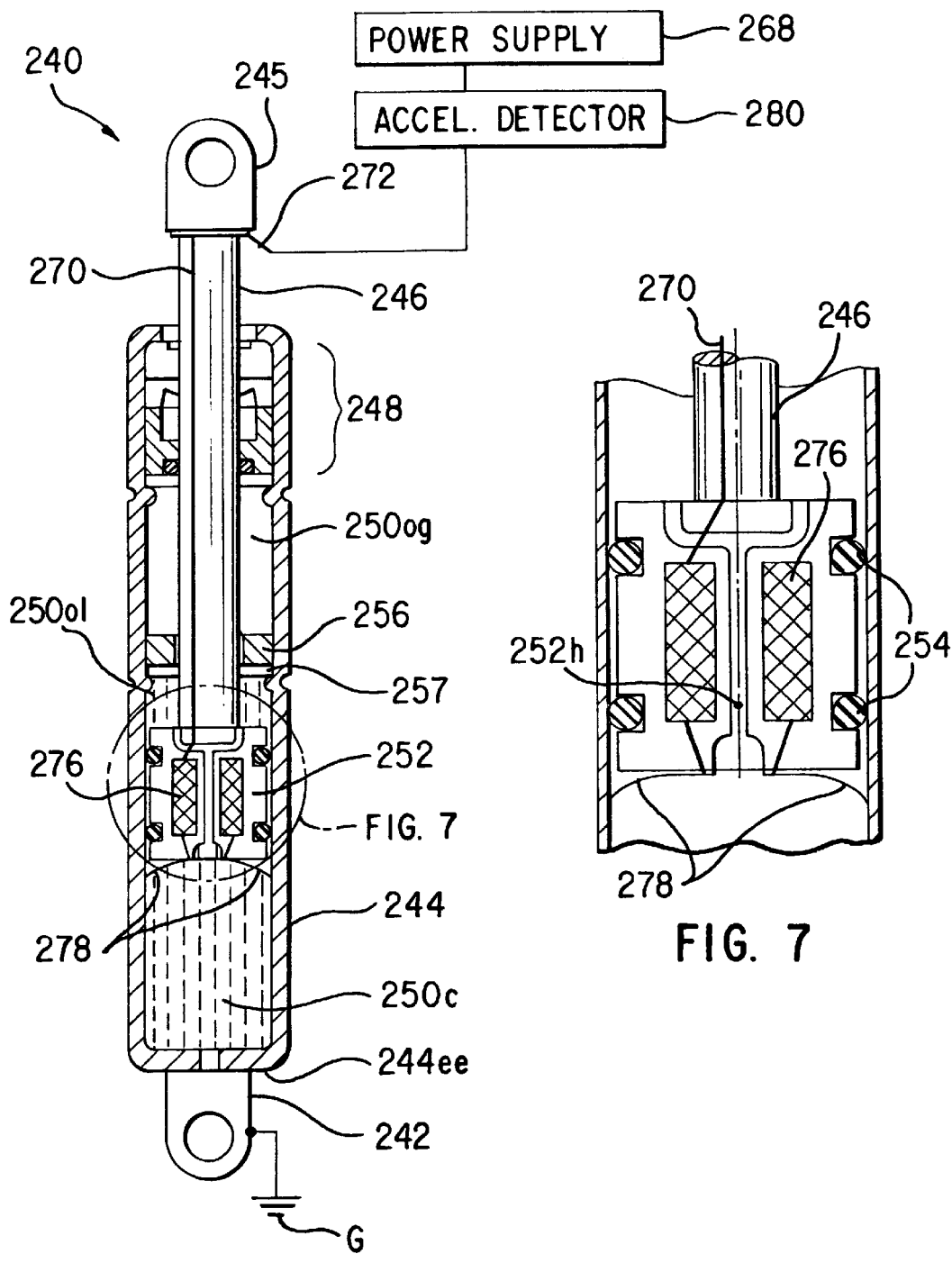

ADJUSTABLE INSTALLATION WITH A CONTROLLED LOCKING GAS SPRING AND AN EMERGENCY LOCKING GAS SPRING

This is a divisional of copending application Ser. No. 08/815,423 filed Mar. 11, 1997.

BACKGROUND OF THE INVENTION

Locking gas springs are well known and widely used in applications in which a member is moved by a spring force to a selected position and locked in that position. Perhaps the most well-known and common use of locking gas springs is in the seat support columns of office chairs. When most or all of the user's weight is off the seat and a control lever is moved to a release position, the spring force extends the spring and raises the seat. When the user sits on the seat and the gas spring is released, the user's weight overcomes the gas spring force, thus compressing the spring and lowering the seat. The user can adjust the seat to any desired height and by releasing the control lever when the desired height has been attained lock the seat in the desired position. Locking gas springs can be used for other adjustable installations, such as hospital beds, various forms of work tables and stands, and adjustable vehicle seat backs, such as for motor vehicles and aircraft.

Safety standards for the seat backs of motor vehicles and aircraft are readily met by locking gas springs used in tandem, that is, a locking gas spring on each side of the seat back. The necessity for tandem installations arises from the need to carry the very high forces imposed on the seat back in a crash, such as the rearward forces that occur when a motor vehicle is rear-ended and the seat occupant is forced back against the seat back by inertial forces or during the rebound phase of a front end collision when the occupant is forced back against the seat back by a restraint system. The tandem use of locking gas springs in vehicle applications requires synchronous control of the two springs by means of relatively costly control linkages.

SUMMARY OF THE INVENTION

One object of the present invention is to provide an adjustable installation, such as a vehicle seat back, that uses gas springs in tandem but does not require linking them, thus eliminating costly and complicated components. Another object is to provide an installation, especially for use in vehicles, in which two gas springs are locked and thus able to sustain the high forces that may be imposed on them in a crash. Yet a further object is to provide a gas spring that normally functions as a non-locking gas spring but that locks when a high force is imposed on it or is caused to lock by the sensing of a high acceleration of the installation in which it is used.

The foregoing objects are attained, in accordance with one aspect of the present invention, by an adjustable installation comprising a body and a member carried by the body for adjustment among a plurality of positions by movements substantially in tandem of two spaced-apart locations on the member. A controllable locking gas spring is coupled between the body and the member at one of the locations, and an emergency locking gas spring is coupled between the body and the member at the other of the locations. The emergency locking gas spring normally acts like a non-locking gas spring and is thus in a follower relationship to the controllable locking gas spring but is locked automatically in either of two ways, depending on its design. The term "follower relationship" is used herein to mean that the emergency locking gas spring (1) extends and exerts a spring force when the controllable locking gas spring is released and extends and (2) is compressed when the controllable gas spring is released and is compressed by an external force applied to the installation. In some designs of the emergency locking gas spring, the emergency locking gas spring locks when a force greater than a predetermined force is imposed on it. In other designs, the emergency locking gas spring is locked in response to a signal generated by, an acceleration detector upon detection of an acceleration of the installation greater than a predetermined acceleration.

An emergency locking gas spring for an installation according to the present invention will include a cylinder, a body of liquid in the cylinder, a rod piston movably received in the cylinder in sealed relation and having a bypass through which the liquid flows upon movement of the piston, and a system for preventing liquid from flowing through the bypass in the event of an emergency that could cause the movable member to move under a high force against the restraint of the emergency locking gas spring. Suitable systems for closing the bypass in an emergency include: a valve that is normally open to allow liquid flow through the bypass but closes when a force in excess of a predetermined force is applied to the rod piston; a quantity of an electro-rheological liquid contained in the cylinder and a detector and energization installation responsive to an acceleration of the installation in excess of a predetermined acceleration for energizing the liquid to increase its viscosity such as to substantially prevent the liquid from flowing through the bypass; a quantity of a magneto-rheological liquid contained in the cylinder and a detector and energization system for sensing acceleration of the installation in excess of a predetermined acceleration and imposing a magnetic field on the liquid to increase its viscosity such as to substantially prevent the liquid from flowing through the bypass.

In some embodiments of systems using a valve to close the bypass, the valve is a member that normally is in clearance from a port of the bypass to allow liquid flow through the bypass when the piston moves under a force less than a predetermined force but is movable into sealing relation to the port by a force due to hydrodynamic pressure imposed on the valve member when the force on the piston exceeds the predetermined force. Such a valve member may be of elastomeric material and is shaped and dimensioned to deform and close the bypass under a high hydrodynamic pressure. With such a valve, a high force imposed on the piston in an emergency produces a high acceleration of the piston, thus producing a high hydrodynamic pressure that acts on the valve member such as to close it.

Another suitable valve member is a member of an elastomeric material having walls defining a passage that forms at least a portion of the bypass, the walls and passage being shaped and dimensioned such that the walls collapse and close the passage in response to liquid flow through the passage at a velocity in excess of a predetermined velocity. In particular, the walls may define a passage having a variable cross-sectional area, the area increasing in the direction of the liquid flow to which the valve responds by closing. In such a design, the increase in the area in the direction of flow produces a zone of reduced pressure within the passage which, along with the high pressure outside the walls of the passage, causes the walls to collapse and close the passage.

In preferred embodiments, the emergency locking gas spring includes a cylinder having a closed end and an open end, a piston rod having a portion received in the cylinder and a portion extending out of the cylinder through the open end, and a seal package received in the open end of the cylinder in sliding and sealed relation to the piston rod and sealed and fixed relation to the cylinder and defining within the piston member a closed chamber. A rod piston is affixed to the portion of the piston rod within the chamber and has a piston seal in sliding and sealed relation to the cylinder and defining in the chamber a closed end section and an open end section, each of a volume that varies in accordance with the position of the rod piston axially of the cylinder. A floating piston received in the open end section in sliding and sealed relation to the cylinder and the piston rod defines in the open end section a gas part between the seal package and the floating piston and a liquid part between the floating piston and the rod piston. A body of liquid, such as oil, is contained in the closed end section and the liquid part of the open end section. A body of gas under pressure substantially above atmospheric pressure is contained in the gas part of the open end section. A bypass in the rod piston allows the liquid to flow through the bypass upon movement of the rod piston except when a valve closes the bypass upon an acceleration of the piston in excess of a predetermined acceleration.

The present invention is especially useful for adjusting the backs of vehicle seats. The controllable locking gas spring and the emergency locking gas spring act in tandem by applying forces to both mounting locations (both sides of the seat back) to move the seat back to its upright-most position when the controllable locking gas spring is released and the user leans forward. With the controllable locking gas spring released, the user can lean back against the seat back to apply a force against the biases of the gas springs and tilt the seat back to a desired tilted-back position. When the seat back is in the desired position, the user locks the controllable lock spring. Under normal conditions, the controllable locking gas spring holds the seat back in the adjusted position. Although the emergency locking gas spring applies a bias to the seat back toward the upright position, it is not locked and is essentially in a follower relationship to the controllable locking gas spring.

In an emergency, the emergency locking gas spring locks and is capable of enduring a very large force and preventing the seat back from moving against the locking direction. As described in more detail below, both gas springs are locked primarily in one direction and can yield in the other direction. In a seat back adjusting installation, the seat back is locked against tilting rearwardly. While the seat back may move forward to its full upright position against the biases of both gas springs, the linkage between the frames of the seat bottom and seat back may be made sufficiently strong to sustain high forces in a crash.

The installation is cost efficient, in that it does not require a linkage such as the one needed for coupling two controllable locking gas springs to control them in tandem. The costs of producing and installing an emergency locking gas spring are comparable to those of producing and installing a controllable locking gas spring.

For a better understanding of the invention, reference may be made to the following description of exemplary embodiments, taken in conjunction with the accompanying drawings.

DESCRIPTION OF THE DRAWINGS

FIG. 6 is a schematic axial cross-sectional view of another form of emergency locking gas spring suitable for an installation, such as the one shown in FIG. 1; and FIG. 7 is a detail axial cross-sectional view of the rod piston of the gas spring of FIG. 6, as indicated by the circle 7 of FIG. 6, showing the piston on a larger scale than in FIG. 6.

DESCRIPTION OF THE EMBODIMENTS

Figure 1:
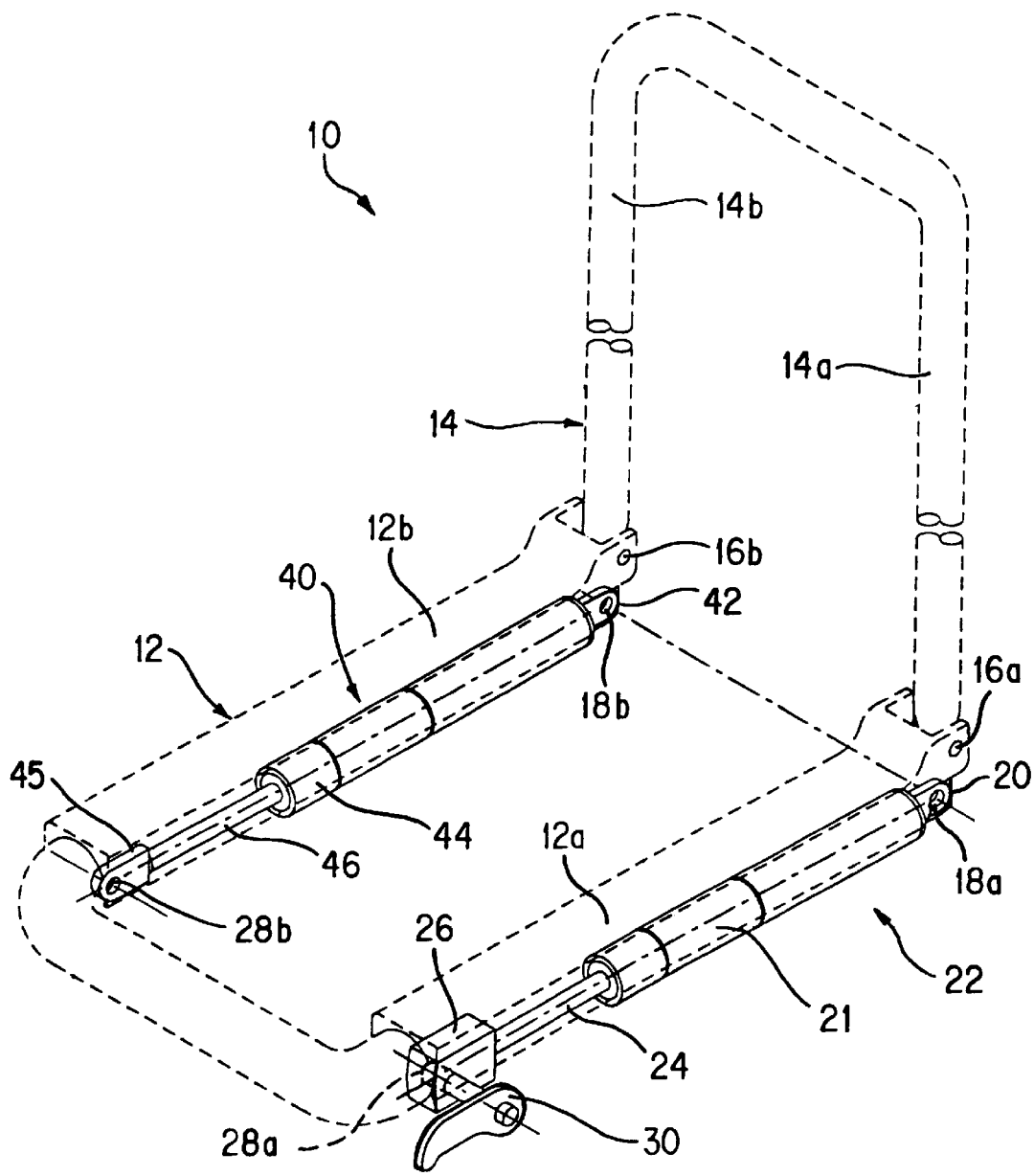
FIG. 1 is a schematic three-quarter pictorial view of a vehicle seat installation.

In FIG. 1 the reference numeral 10 indicates the frame of a vehicle seat of the type having an adjustable back. The frame 10 includes a seat bottom frame 12 having side members 12a and 12b and a seat back frame 14 having side members 14a and 14b. The rearward ends of the respective side members of the seat bottom frame support the lower ends of the side members; of the seat back frame for pivotal movement at two spaced-apart locations, namely, pivot couplings 16a and 16b at the lower back of each side of the seat. The pivot couplings allow the seat back to be adjusted to any position between an upright position (as shown) and a rearwardly tilted position (not shown).

The lower end of the side member 14a of the seat back frame 14 extends downwardly below the pivot coupling 16a and is connected by a pivot coupling 18a to a fitting 20 on the cylinder 21 of a controllable locking gas spring 22, which may be of any suitable construction, such as a Stabilus "BLOC-O-LIFT" gas spring made by Fichtel and Sachs Industries, Inc., of Colmar, Pa. The piston rod 24 of the gas spring 22 is connected by a fitting 26 to a pivot coupling 28a on the seat bottom frame member 12a. Upon movement of an adjustment lever 30 to a release position, the gas spring 22 exerts a compression force between the pivot couplings 18a and 28a that biases the seat back 14 toward its upright position. If the user leans forward, the seat back will be pushed by the gas spring 22 to the upright position. By pushing back against the seat, the user can tilt the seat back against the bias of the gas spring 22 to a desired position. Upon release of the adjustment lever 30, the gas spring 22 locks and holds the position of the seat back.

An emergency locking gas spring 40 is coupled by a pivot coupling 18b, which is located below the coupling 16b, and a fitting 42 on the cylinder 44 to the lower end of the seat back side member 14b and by a pivot coupling 28b and a fitting 45 on the piston rod 46 to the seat bottom side member 12b. The emergency locking gas spring 40 normally exerts a force between the seat bottom frame and the seat back frame that biases the seat back to an upright position but yields to a rearward force exerted by the user on the seat back to enable the seat back to be tilted rearwardly against the bias when the controllable locking gas spring 22 is released. In normal operation of the two gas springs 22 and 40, the controllable locking gas spring 22 holds the seat back in the desired position, and the emergency locking gas spring 40 is in a follower relationship to the controlled locking gas spring. Depending upon its design, the emergency locking gas spring 40 locks in response to either (1)

a force imposed on it in excess of a predetermined force or (2) a signal generated by an acceleration detector that detects an acceleration of the vehicle greater than a predetermined acceleration.

Figure 2:
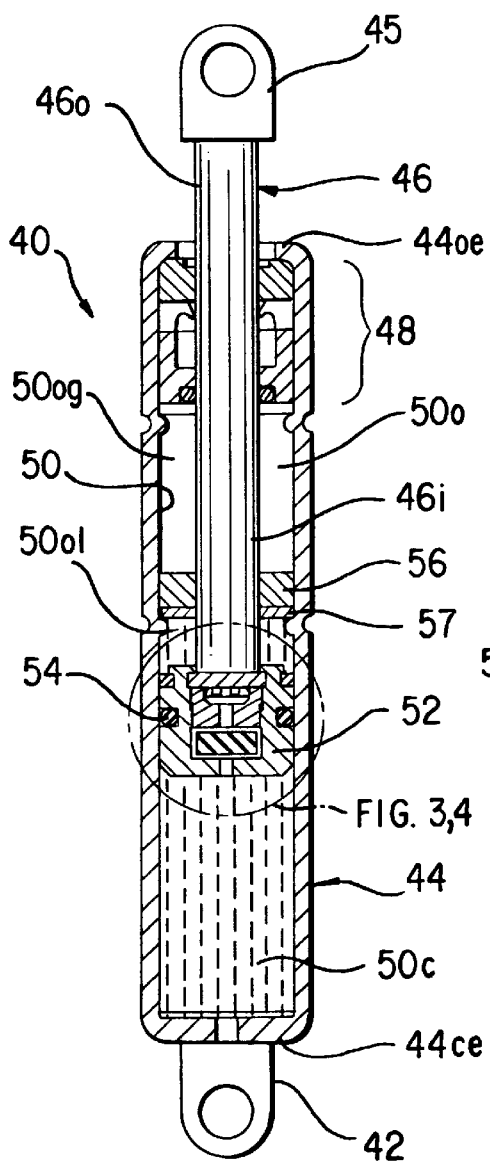
FIG. 2 is a schematic axial cross-sectional view of an emergency locking gas spring suitable for an installation, such as the one shown in FIG. 1.
Figure 3:
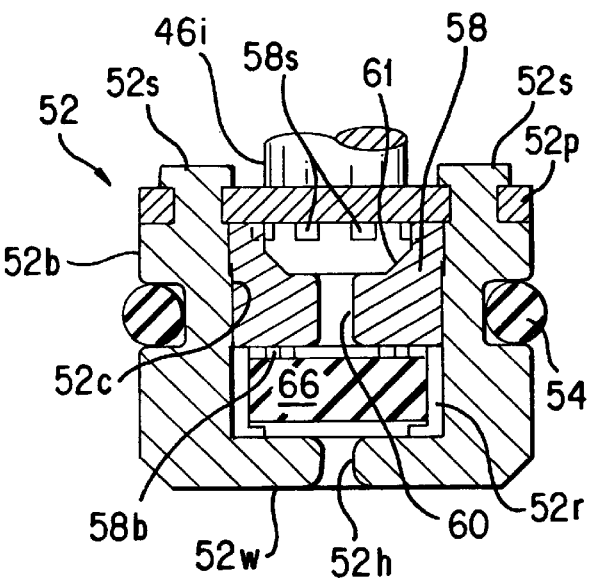
FIG. 3 is a detail axial cross-sectional view of the rod piston of the gas spring of FIG. 2, as indicated by the circle 3, 4 of FIG. 2, showing the piston on a larger scale than in FIG. 2 and showing the bypass in its open condition.
Figure 4:
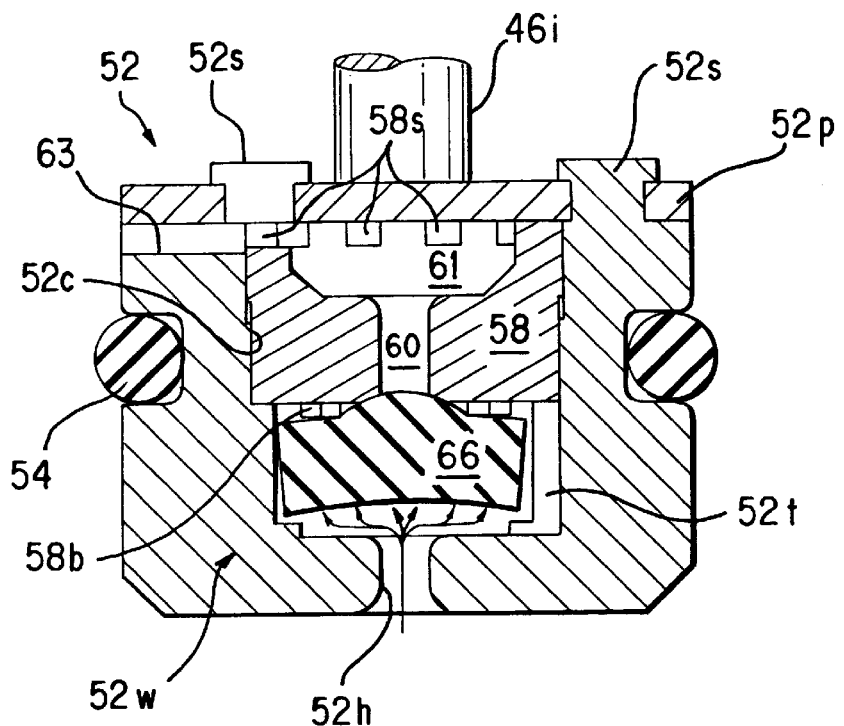
FIG. 4 is another detail axial cross-sectional view of the rod piston of the gas spring of FIG. 2, showing the piston on a larger scale than in FIG. 3 and showing the bypass in its closed condition.

One embodiment of an emergency locking gas spring 40 suitable for the vehicle seat of FIG. 1, as shown in FIGS. 2 to 4, includes the cylinder 44 and piston rod 46 (referred to above). The cylinder has a closed end 44ce and an open end 44oe. The piston rod 46 has a portion 46i received in the cylinder and a portion 46o extending out of the cylinder through the open end 44oe. A seal package 48 received in the open end of the cylinder is in sliding and sealed relation to the piston rod 46 and sealed and fixed relation to the cylinder 44 and defines within the cylinder a closed chamber 50.

A rod piston 52 affixed to the portion 46i of the piston rod within the chamber 50 carries a piston seal 54 that is in sliding and sealed relation to the cylinder and defines in the chamber 50 a closed end section 50c between the piston seal and the closed end of the cylinder and an open end section 50o between the piston seal 54 and the seal package 48, each section having a volume that varies in accordance with the position of the rod piston 52 axially of the cylinder 44.

A floating piston 56 and an associated back-up washer 57 received in the open end section 50o in sliding and sealed relation to the cylinder 44 and to the piston rod 46 define in the open end section 50o (1) a gas part 50og between the seal package 48 and the floating piston 56, which contains a gas at a pressure considerably above atmospheric pressure, and (2) a liquid part 50ol between the floating piston 56 and the rod piston seal 54, which contains a liquid, such as oil. The closed end section 50c also contains the liquid. The gas in the gas part 50og maintains the liquid in the chamber under high pressure at all times, thereby providing the spring force, which is a force due to the gas, (and liquid) pressure (gauge) acting over the area of the piston rod 46 within the seal of the seal package 48.

The rod piston 52 has a disc-like base plate 52p that is fastened to the piston rod 46. Holes on the base plate accept studs 52s on a rod piston body 52b, the studs being peened over to provide retaining heads that secure the body 52b to the base plate 52p. A central cavity 52c in the rod piston body receives an insert 58, which has a hole 60, a recess 61 and radial slots 58s that form parts of a bypass through which liquid can flow in either direction between the liquid part 50ol of the open end section 50o of the cylinder chamber and the closed end section 50c. Radial slots 63 in the piston body communicate with the slots 58s in the insert.

A shuttle valve member 66 of an elastically deformable material is held in a clearance relation to the walls of the cavity 52c by L-shaped ribs 52r and in clearance relation to the insert 58 by several bosses 58b on the insert located in spaced-apart relation concentrically to the hole 60, thus providing for flow of liquid around the perimeter of the shuttle valve member to and from the bypass hole 60. The rod piston body 52b has a central hole 52h in a transverse end wall 52w of the cavity 52c that also forms part of the bypass.

In the state of the rod piston assembly shown in FIG. 3, liquid can flow in either direction through the rod piston bypass (the hole 52h, the clearance around the perimeter of the shuttle valve member 66, the hole 60, the recess 61, and the radial slots 58s and 63) as the piston rod extends from or retracts into the cylinder chamber 50 during adjustments of the seat back or other member with which the gas spring is used. In that regard, the "BLOC-O-LIFT" gas spring 22 and similar controllable locking gas springs have bypasses that limit the speed of extension and retraction. Accordingly, even if the user should exert a large force rearwardly on the seat back during adjustment, the piston rod of the emergency locking gas spring 40 of FIGS. 2 to 4, as it is compressed in following relation to the gas spring 22, moves sufficiently slowly to prevent liquid flowing through the bypass from attaining a hydrodynamic pressure large enough to deform the valve member 66 and close the bypass.

In a crash of a vehicle having a seat back 14 supported by the emergency locking gas spring 40 (see FIG. 1), it is possible that the seat back will be subjected to a force acting to tilt the seat back rearwardly that is sufficiently high to move the piston rod and rod piston rapidly toward the closed end of the cylinder (down in FIGS. 2 to 4). As discussed above, the controllable locking retractor is locked against retraction, but a high force on the seat back can deform the seat back itself, moving the side supported by the emergency locking gas spring rearwardly. A high force imposed on the rod piston and resulting in rapid acceleration of the rod piston toward the closed end produces a high velocity jetting of liquid through the hole 52h in the rod piston body 52b, which acts against the center region of the deformable shuttle valve member 66 and deforms the valve member in a cup-like fashion so that it engages the wall of the insert 58 around the hole 60 and prevents liquid from flowing through the rod piston bypass from the closed end section 50c into the liquid part 50ol (see FIG. 4). Liquid is trapped in the closed end section and prevents the rod piston 52 from moving toward the closed end of the cylinder, even against forces of several hundred pounds.

High forces acting on the seat back 14 and tending to move it to an upright position can overcome the resisting forces of the gas springs 22 and 40 by compressing the gases contained in the open end gas-containing parts of the cylinder chambers. Therefore, the seat back should be constructed with mechanical stops to limit forward tilting of the seat beyond its normal upright position. Alternatively or in addition, the gas springs can be designed with mechanical stops to limit the extension of the piston rods beyond that required to attain the upright-most position of the seat back.

Figure 5:
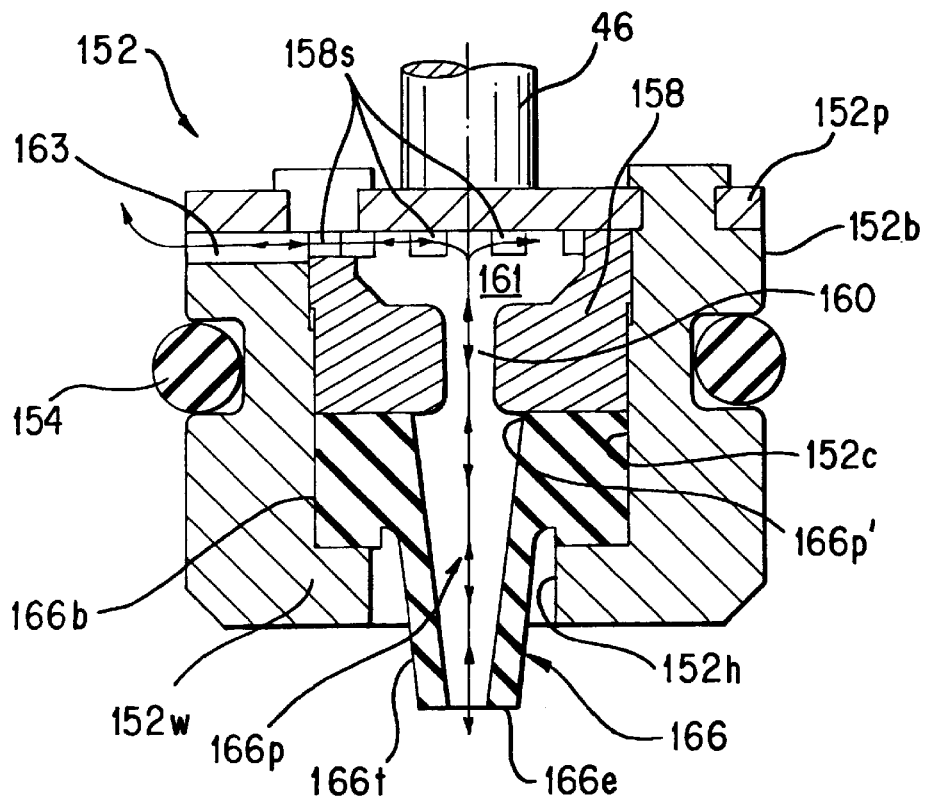
FIG. 5 is an axial cross-sectional view of another rod piston that can be provided in the gas spring of FIG. 2.

Various forms of valves that allow liquid to flow through the rod piston bypass in normal conditions but close upon rapid acceleration of the rod piston toward the closed end of the cylinder are possible. One example of another form of valve is shown in FIG. 5. The components of the rod piston of FIG. 5 are substantially the same as the rod piston of FIGS. 2 to 4 and are, therefore, designated by the reference numerals used in FIGS. 2 to 4 increased by 100.

A valve member 166 of an elastomeric material has an annular body portion 166b that is received in captured and sealed relation within the cavity 152c of the piston body 152b between an insert 158 and a transverse end wall 152w. A nozzle-like tubular portion 166t extends from the body portion freely through a hole 152h in the wall 152w. A passage 166p that is narrowest at the free end 166e of the tubular portion and progressively widens toward a port 166p' in the body portion 166b allows liquid to pass in either direction through the rod piston bypass (hole 160, recess 161, and slots 158s and 163) under normal conditions, i.e., when the emergency locking gas spring is being extended or compressed in follower relationship to the controllable locking gas spring during adjustment of the seat back.

In an emergency, such as a crash of the vehicle, that causes a high force to be imposed rearwardly on the seat back 14, the piston 152 is accelerated rapidly toward the closed end of the cylinder (down in FIG. 5). Liquid in the closed end section (50c, FIG. 2) begins to flow virtually instantaneously at a high hydrodynamic pressure through the narrow end of the tube portion 166t of the valve member 166. The progressive enlargement of the passage produces a low pressure zone along the walls of the passage downstream from the narrow inlet end. Meanwhile, the outer walls of the tube portion 166t are subject to a high hydrodynamic pressure, resulting from acceleration of the rod piston 152 against the liquid. The pressure difference between the inside and outside walls of the tube portion 166t cause it to constrict and close the passage 166p. Closing of the passage 166p stops the flow of liquid through the rod piston bypass, and the trapping of liquid in the closed end section 50c (FIG. 2) of the chamber 50 of the gas spring prevents the rod piston from moving farther toward the closed end 44ce of the cylinder. The emergency locking gas spring cannot be compressed, and the side of the seat back 14 (FIG. 1) supported by the emergency locking gas spring is prevented from tilting back.

Another embodiment of an emergency locking gas spring 240 suitable for use on one side of an installation in which a member is supported relative to a body at two locations by gas springs is shown in FIGS. 6 and 7, in which corresponding components are given the reference numerals of FIG. 2 increased by 200. The liquid contained in the closed end section 250c and the liquid part 250ol of the open end section of the gas spring chamber 250 is a magneto-rheological liquid. The rod piston 252 has a bypass 252h through which the liquid can normally flow as the rod piston 252 moves in either direction along the cylinder when the position of the member supported by the gas spring 240 is being changed.

A power supply 268 is connected by a wire 270 that runs through the piston rod 246 from a terminal 272 to one end of an electromagnetic coil 276 that is installed in an annular compartment of the rod piston 252 surrounding the bypass 252h. The other end of the coil 276 is connected to ground G by sliding spring contacts 278 that engage the walls of the cylinder 244. The supply of current to the coil 276 is controlled by an acceleration detector 280. In a vehicle, the acceleration detector may also be associated with one or more components of an occupant restraint system. Upon sensing an acceleration of the vehicle (or other member with which the gas spring 240 is used) greater than a predetermined acceleration, current is conducted through the coil, thus producing a magnetic field in the bypass 252h. As is known per se, the viscosity of the magneto-rheological liquid in the bypass 252h is increased by the magnetic field sufficiently so that the liquid is unable to flow through the bypass 252h. The liquid trapped in the closed end section 250c of the chamber (between the rod piston 252 and the closed end 244ce of the cylinder 244) prevents the rod piston 252 from moving toward the closed end 244ce of the cylinder, thus keeping the emergency locking gas spring 240 from compressing under the emergency load.

An emergency locking gas spring substantially identical to the one shown in FIGS. 6 and 7 can be provided with electrodes on opposite sides of the bypass 252h instead of a coil around the bypass and contain an electro-rheological liquid. Upon energization of the electrodes, the electric field across the passage increases the viscosity of the liquid in the bypass; and stops liquid flow through the bypass.

I claim:
1. An adjustable installation, comprising:
a body;
a member carried by the body for adjustment among a plurality of positions by movements substantially in tandem of two spaced-apart locations on the member;
a controlled locking gas springcoupled between the body and the member at one of the locations, said controlled locking gas spring being normally locked and being selectively unlocked to permit adjustment of the position of the member; and
an emergency locking gas spring coupled between the body and the member at the other of the locations, the emergency locking gas spring normally being in an unlocked follower relationship to the controlled locking gas spring, such that, upon the selective unlocking of the controlled locking gas spring, adjustment of the position of the member is possible without selectively unlocking of the emergency locking gas spring and being locked in response to the sudden accelerated movement of the member or the installation.

2. An adjustable installation according to claim 1 wherein the emergency locking gas spring includes a cylinder, a body of liquid in the cylinder, a piston movable received in the cylinder in sealed relation and having a bypass through which the liquid flows up movement of the piston, and a valve adapted to close the bypass in response to an acceleration of the piston greater than a predetermined acceleration.

3. An adjustable installation according to claim 1 wherein the emergency locking gas spring includes a cylinder, a quantity of an electro-rheological liquid contained in the cylinder, a piston received in the cylinder and having a bypass through which the liquid can normally flow as the piston moves along the cylinder, and apparatus responsive to acceleration of the installation in excess of a predetermined acceleration adapted to energize the liquid to increase its viscosity and to substantially prevent the liquid from flowing though the bypass.

4. An adjustable installation according to claim 1 wherein the emergency locking gas spring includes a cylinder, a quantity of a magneto-rheological liquid contained in the cylinder, a piston received in the cylinder and having a bypass through which the liquid can normally flow as the piston moves along the cylinder, and apparatus responsive to acceleration of the installation in excess of a predetermined acceleration adapted to impose a magnetic field on the liquid to increase its viscosity and to substantially prevent the liquid from flowing through the bypass.

5. An adjustable installation according to claim 1 wherein the emergency locking gas spring includes a piston having a bypass and a valve adapted to close the bypass in response to an acceleration of the piston greater than a predetermined acceleration, the valve including a valve member that normally is in clearance from a port of the bypass and is movable into sealing relation to the port by a force due to hydrodynamic pressure imposed on the valve member.

6. An adjustable installation according to claim 1 wherein the emergency locking gas spring includes a piston having a bypass and a valve adapted to close the bypass in response to an acceleration of the piston greater than a predetermined acceleration, the valve including a valve member of an elastomeric material and having walls defining a passage that forms at least a portion of the bypass, the walls and passage being shaped and dimensioned such that the walls collapse and close the passage in response to liquid flow through the passage at a velocity in excess of a predetermined velocity.

7. An adjustable installation according to claim 6 wherein the walls of the valve member defining the passage have a variable cross-section area, the area increasing in the direction of the liquid flow to which the valve responds by closing.

8. An adjustable installation according to claim 1 wherein the body is a frame of a vehicle seat and the member is a back of the seat and is pivotally mounted on the frame at pivot mounts proximate to said locations.

9. An adjustable installation according to claim 1 wherein the emergency locking gas spring includes a cylinder having a closed end and an open end, a piston rod having a portion received in the cylinder and a portion extending out of the cylinder through the open end, a seal package received in the open end of the cylinder in sliding and sealed relation to the piston rod and sealed and fixed relation to the cylinder and defining within the cylinder a closed chamber, a rod piston affixed to the portion of the piston rod within the chamber and having a piston seal in sliding and sealed relation to the cylinder and defining in the chamber a closed end section between the piston seal and the closed end of the cylinder and an open end section between the piston seal and the seal package, each section having a volume that varies in accordance with the position of the rod piston axially of the cylinder, a floating piston received in the open end section in sliding and sealed relation to the cylinder and the piston rod and defining in the open end section a gas part between the seal package and the floating piston and a liquid part between the floating piston and the rod piston, a body of liquid contained in the closed end section and the liquid part of the open end section, a body of gas under pressure substantially above atmospheric pressure contained in the open end section and pressurizing the liquid part of the closed end section, a normally open bypass in the rod piston through which the liquid flows upon movement of the rod piston, and a valve adapted to close the bypass in response to an acceleration of the rod piston greater than a predetermined acceleration.

10. An adjustable installation according to claim 9 wherein the valve includes a valve member that normally is in clearance from a port of the bypass and is movable into sealing engagement with the surface around the port by a force due to a hydrodynamic pressure imposed on the valve member in excess of a predetermined hydrodynamic pressure.

11. An adjustable installation according to claim 10 wherein the valve member is a body of elastomeric material having a portion that normally overlies the port of the bypass with a clearance to allow liquid to flow through the bypass and that is deformable by liquid pressure into sealed relation with the port of the bypass to prevent liquid from flowing through the bypass.

12. An adjustable installation according to claim 11 wherein the port opens at a surface of the rod piston facing the closed end section.

13. An adjustable installation according to claim 11 wherein the body of elastomeric material is received in a valve chamber of the rod piston, the valve chamber being defined in part by a wall on a side of the piston opposite the surface, and the wall having a hole generally aligned axially with the port that directs a stream of liquid against a region of the body of elastomeric material opposite the port.

14. An adjustable installation according to claim 9 wherein the valve includes a valve member of an elastomeric material and having walls defining a passage that forms at least a portion of the bypass, the walls and passage being shaped and dimensioned such that the walls collapse and close the passage in response to liquid flow through the passage at a velocity in excess of a predetermined velocity.

15. An adjustable installation according to claim 14 wherein the walls of the valve member defining the passage have a variable cross-sectional area, the area increasing in the direction of the liquid flow to which the valve responds by closing.

16. An adjustable installation according to claim 15 wherein the passage of the valve member has an entrance opening remote from the rod piston bypass that communicates with the closed end section.

17. An adjustable installation according to claim 1 wherein the emergency locking gas spring is locked in response to a force imposed on the emergency locking gas spring in excess of a predetermined force.

18. An adjustable locking gas spring according to claim 1 wherein the emergency locking gas spring is locked in response to a signal generated by an acceleration detector.

* * * * *

UNITED STATES PATENT AND TRADEMARK OFFICE
CERTIFICATE OF CORRECTION

PATENT NO. : 6,206,153 B1
DATED : March 27, 2001
INVENTOR(S) : Popjoy

It is certified that error appears in the above-identified patent and that said Letters Patent is hereby corrected as shown below:

Column 8,
Line 1, "springcoupled" should read -- spring coupled --
Line 18, "movable" should read -- movably --
Line 65, "cross-section" should read -- cross-sectional --

Column 4,
Line 26, "members;" should read -- members --

Signed and Sealed this

Twenty-sixth Day of February, 2002

Attest:

Attesting Officer

JAMES E. ROGAN
Director of the United States Patent and Trademark Office